US012650353B2

(12) United States Patent
Benslimane

(10) Patent No.: US 12,650,353 B2
(45) Date of Patent: Jun. 9, 2026

(54) METHOD FOR ASSEMBLING A PRESSURE SENSOR ARRANGEMENT AND PRESSURE SENSOR ARRANGEMENT

(71) Applicant: Danfoss A/S, Nordborg (DK)

(72) Inventor: Mohamed Yahia Benslimane, Nordborg (DK)

(73) Assignee: DANFOSS A/S, Nordborg (DK)

( * ) Notice: Subject to any disclaimer, the term of this patent is extended or adjusted under 35 U.S.C. 154(b) by 383 days.

(21) Appl. No.: 18/355,446

(22) Filed: Jul. 20, 2023

(65) Prior Publication Data

US 2024/0027293 A1     Jan. 25, 2024

(30) Foreign Application Priority Data

Jul. 21, 2022    (DE) .......................... 102022118333.5

(51) Int. Cl.
*G01L 19/00*          (2006.01)

(52) U.S. Cl.
CPC ................................. *G01L 19/0007* (2013.01)

(58) Field of Classification Search
CPC . G01L 19/147; G01L 9/0072; G01L 19/0645;
G01L 19/0084; G01L 13/025; G01L
19/0007; G01L 9/0042; G01L 19/0038;
G01L 9/0073; G01L 9/0075; G01L
9/0054; G01L 9/0055; G01L 19/04;
(Continued)

(56) References Cited

U.S. PATENT DOCUMENTS

| | | | |
|---|---|---|---|
| 6,945,120 B1 | 9/2005 | Marcus et al. | |
| 2016/0025585 A1* | 1/2016 | Dammen | .............. G01L 19/147 |
| | | | 73/706 |
| 2018/0182796 A1 | 6/2018 | Tuominen | |

FOREIGN PATENT DOCUMENTS

| | | | | |
|---|---|---|---|---|
| DE | 10033997 A1 * | 2/2001 | ......... | G01L 19/0084 |
| DE | 102022101816 A1 * | 7/2023 | ........... | G01L 19/142 |

(Continued)

*Primary Examiner* — Andre J Allen

(74) *Attorney, Agent, or Firm* — McCormick, Paulding & Huber PLLC

(57)          ABSTRACT

A pressure sensor arrangement includes a housing with a sensor chamber and a pressure connector with a fluid inlet opening and a fluid channel, a subassembly with an electrical connector and a pressure sensing element, and a preformed resin component with a hole and an embedded carrier structure. A method for assembling a pressure sensor arrangement includes the steps of: positioning the preformed resin component at the pressure connector such that the fluid inlet opening and the hole communicate with each other, pressing the subassembly against the preformed resin component such that the pressure sensing element communicates with the hole, fixing the housing to the subassembly, and curing the resin component to create a hermetic connection between the pressure connector and the pressure sensing element. The invention further discloses a pressure sensor arrangement including a housing with a sensor chamber and a pressure connector with a fluid inlet opening and a fluid channel, a subassembly with an electrical connector and a pressure sensing element, and a preformed resin component with a hole provided between the subassembly and the pressure connector, wherein the pressure sensor arrangement is assembled by the previously described method.

19 Claims, 8 Drawing Sheets

(58) Field of Classification Search

CPC . G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 7/08; G01L 9/0076; G01L 9/0025; G01L 9/0035; G01L 19/0061; G01L 9/0005; G01L 9/0041; G01L 9/0019; G01L 9/08; G01L 9/10; G01L 21/00; G01L 9/04; G01L 11/006; G01L 19/086; G01L 9/00; G01L 9/0008; G01L 1/18; G01L 11/004; G01L 19/069; G01L 9/0057; G01L 19/083; G01L 19/06; G01L 19/10; G01L 19/16; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 13/06; G01L 23/16; G01L 7/088; G01L 7/163; G01L 9/0007; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/2268; G01L 11/06; G01L 21/30; G01L 21/34; G01L 7/187; G01L 7/20; G01L 1/146; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 5/24; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106

USPC .................................................. 73/700–756

See application file for complete search history.

(56) References Cited

FOREIGN PATENT DOCUMENTS

| | | | | | |
|---|---|---|---|---|---|
| JP | 2005037311 A | * | 2/2005 | | |
| JP | 2006208383 A | * | 8/2006 | .......... | G01L 9/0075 |
| JP | 2016-14555 A | | 1/2016 | | |
| JP | 7114814 B2 | * | 8/2022 | ......... | G01L 19/0038 |
| WO | WO-2019055642 A3 | * | 7/2020 | ............ | G01F 1/383 |
| WO | WO-2020139768 A1 | * | 7/2020 | ............... | G01L 9/06 |

* cited by examiner

21

22

221

222

23

25

24

27

26

3

3

METHOD FOR ASSEMBLING A PRESSURE SENSOR ARRANGEMENT AND PRESSURE SENSOR ARRANGEMENT

CROSS-REFERENCE TO RELATED APPLICATION

This application claims foreign priority benefits under 35 U.S.C. § 119 from German Patent Application No. 102022118333.5, filed Jul. 21, 2022, the content of which is hereby incorporated by reference in its entirety.

TECHNICAL FIELD

The present invention pertains to a method for assembling a pressure sensor arrangement, and, in particular, to assembling a hermetic pressure sensor arrangement. The present invention also pertains to pressure sensor arrangements and, in particular, to hermetic pressure sensor arrangements.

BACKGROUND

Pressure sensor arrangements are used for measuring pressures of fluids. The pressure sensor arrangements may be used in various applications such as chemical or manufacturing processes. Typically, the pressure sensor arrangement is assembled by a manufacturer and provided to a user. The pressure sensor arrangement is then used by the user at a given process. The arrangement provides a fluid connection between a sensing unit and a fluid, the pressure of which is to be measured. The arrangement converts the fluid pressure to electrical signals. Electrical connectors are provided for electrical supply and output of sensor signals.

The pressure sensor arrangements have to provide reliable pressure measurements over prolonged periods of time. In order to achieve this goal, the pressure sensor arrangements are manufactured and assembled to a high standard. Leakages and other malfunctions of the pressure sensor arrangements can thus be avoided as much as possible.

From prior art document U.S. Pat. No. 6,945,120 B1 a backside MEMS pressure sensor arrangement is known, which comprises a housing, a connector and a sensor sensing unit. The combined sensing unit and connector are connected to the housing by dispensing adhesive in the housing and mounting the sensing unit and connector into the housing. Inside the housing, gap features of the housing determine the adhesive height. After curing of the adhesive, the housing is crimped onto the connector and sealed by applying and curing adhesive at the crimping area.

In order to keep assembly costs low, it is known to manufacture such arrangements by assembling several prefabricated subassemblies, such as pressure housings and/or connectors.

A problem arising from these known methods is that they require rather complicated assembly steps and therefore induce high assembly costs. Also, if an adhesive is used in the housing and/or e.g. on a carrier, special arrangements are required to ensure a predetermined gap or adhesive thickness. Using adhesives such as RTV adhesives and/or O-ring seals provides only limited hermeticity due to permeability properties of these materials, in particular with regards to flammable gasses.

SUMMARY

It is the aim of the invention to provide an improved assembly method for a pressure sensor arrangement and an improved pressure sensor arrangement, which overcome this problem and reduce assembly costs by simplifying the assembly method.

This aim is reached by a method according to claim 1 and a pressure sensor arrangement according to claim 9. Preferable embodiments are subject to the dependent claims.

According to claim 1, a method for assembling a pressure sensor arrangement is provided. The pressure sensor arrangement comprises a housing with a sensor chamber and a pressure connector with a fluid inlet opening and a fluid channel, a subassembly with an electrical connector and a pressure sensing element, and a preformed resin component with a hole and an embedded carrier structure. The method comprises the steps of

- positioning the preformed resin component at the pressure connector such that the fluid inlet opening and the hole communicate with each other,
- pressing the subassembly against the preformed resin component such that the pressure sensing element communicates with the hole,
- fixing the housing to the subassembly, and
- curing the resin component to create a hermetic connection between the pressure connector and the pressure sensing element.

The hermetic connection between the pressure connector and the pressure sensing element ensures that no fluid can leak into the housing volume outside the pressure sensing element.

The fluid inlet opening of the pressure connector and the hole of the preformed resin component may communicate with each other in the sense that they are aligned with each other and a uniform fluid pressure can be present in the hole and the fluid inlet opening. The pressure sensing element communicating with the hole also refers to a uniform fluid pressure within the hole and at a portion of the pressure sensing element.

The housing may be delimiting a chamber volume to accommodate the pressure sensing element and/or a portion of the electrical connector. The volume inside the housing may be the sensor camber.

The electrical connector may comprise electrical leads for both, power supply to the pressure sensing element and output signal delivery from the sensing element to the external environment. The connector may be provided for plug or cable connections, and may preferably be manufactured from electrically insulating polymer materials.

The connection between the pressure sensing element and the electrical connector forming the first subassembly may be directly between a first PCB and the leads of the electrical connector, e.g. by soldered wires or flexible printed circuit boards. Alternatively, pin connectors may be used between the first PCB and a second PCB attached to the leads of the electrical connector. Resilient portions at both axial ends of the pin connectors may be pressed into corresponding openings of first and second PCBs.

When positioning the preformed resin component at the pressure connector, the two components may be brought in close and direct contact with each other. The preformed resin component may be positioned at the pressure connector together with the subassembly or prior to the positioning of the subassembly.

When the subassembly is pressed against the preformed resin component, it needs to be ensured that the pressure sensing element communicates with the hole. The pressure sensing element or, more precisely, a sensor of the pressure sensing element, needs to contact the fluid for determining its pressure. Therefore, the arrangement provides a fluid connection between the pressure sensing element and the outside of the arrangement exposed to the measured fluid.

In a preferred embodiment of the invention, the preformed resin component comprises heat curable epoxy resin material and/or the embedded carrier structure is an embedded woven glass fabric carrier structure. The carrier structure ensures that the preformed resin component is not compressed too much when the subassembly is pressed against the preformed resin component. The heat curable epoxy resin material facilitates a controllable curing of the preformed resin component once all required components are assembled prior to the curing step.

In another preferred embodiment of the invention, the pressure sensing element comprises a pressure sensing sensor such as a MEMS pressure sensor, a thin film strain gauge sensor on a flexible metal or ceramic membrane and/or a capacitive sensor.

The pressure sensing element may comprise a backside exposed MEMS pressure sensor die. However, other pressure sensing sensors, e.g. thin film strain gauge sensors on flexible metal or ceramic membranes, or capacitive sensors may be assembled with the inventive method.

The pressure sensing element may be regarded as a third subassembly preferably comprising a MEMS element, e.g. a silicon pressure sensor chip mounted with its backside on a glass support. The chip and/or glass support may be secured to a first end surface of a ceramic carrier element for temperature protection and stress relief with an adhesive. The first PCB may also be fastened, e.g. glued, to the first end face of the ceramic carrier. The first PCB may comprise a central opening to accommodate the sensor chip and glass support. The first PCB may comprise electronic components for e.g. temperature compensation, calibration and other signal processing circuitry. Wire bonds may be used to electrically connect the sensor chip with the first PCB. The pressure sensing element may be calibrated and temperature compensated at its subassembly state, or at a later state in manufacturing the pressure sensor arrangement.

In another preferred embodiment of the invention, the preformed resin component is positioned at the pressure connector together with or without the subassembly. It is conceivable to first connect the preformed resin component to the subassembly and only then position the preformed resin component together with the subassembly at the pressure connector.

In another preferred embodiment of the invention, the electrical connector is connected to the pressure sensing element to form the subassembly prior to the pressing of the subassembly against the preformed resin component. All required steps for forming the functioning subassembly such as connecting and/or testing the subcomponents of the subassembly may be performed prior to the assembly of the entire pressure sensor arrangement, thereby facilitating the manufacturing of the subassembly.

In another preferred embodiment of the invention, the housing is crimped to the electrical connector of the subassembly while the subassembly is pressed against the preformed resin component. The crimping of the housing to the electrical connector may be the only connection between the two components. This means, that no additional gluing or other connection between the two components may be required.

In another preferred embodiment of the invention, temperature compensation and/or calibration of the pressure sensing element is performed during the curing of the resin component. As the desired compensation temperatures are within the necessary temperature range for curing the epoxy material, the compensation and/or calibration of the pressure sensing element can be performed at the same time as the curing, thereby reducing the overall time required for assembling the pressure sensor arrangement. Here, processes such as compensation and/or calibration are regarded as part of the assembly process.

In another preferred embodiment of the invention, a connector element is connected to the pressure connector. The connector element may fluidly connect the inside of the housing to a fluid system, in which a fluid pressure is measured by the pressure sensor arrangement. This connection may be done by a threaded connector element and/or by a tubular element, e.g. a soldered tube, with any suitable dimensions. The housing and/or the connector element may be formed of any suitable metal material. They may be formed as an integral part or as separate parts secured to each other by suitable methods such as welding or soldering.

The invention is also directed at a pressure sensor arrangement comprising a housing with a sensor chamber and a pressure connector with a fluid inlet opening and a fluid channel, a subassembly with an electrical connector and a pressure sensing element, and a preformed resin component with a hole provided between the subassembly and the pressure connector. The pressure sensor arrangement is assembled by the presently described method. The pressure sensor arrangement may comprise any of the physical features described with reference to the assembly method.

BRIEF DESCRIPTION OF THE DRAWINGS

Further details and advantages of the invention are described with reference to the figures. The figures show.

DETAILED DESCRIPTION

Figure 1:
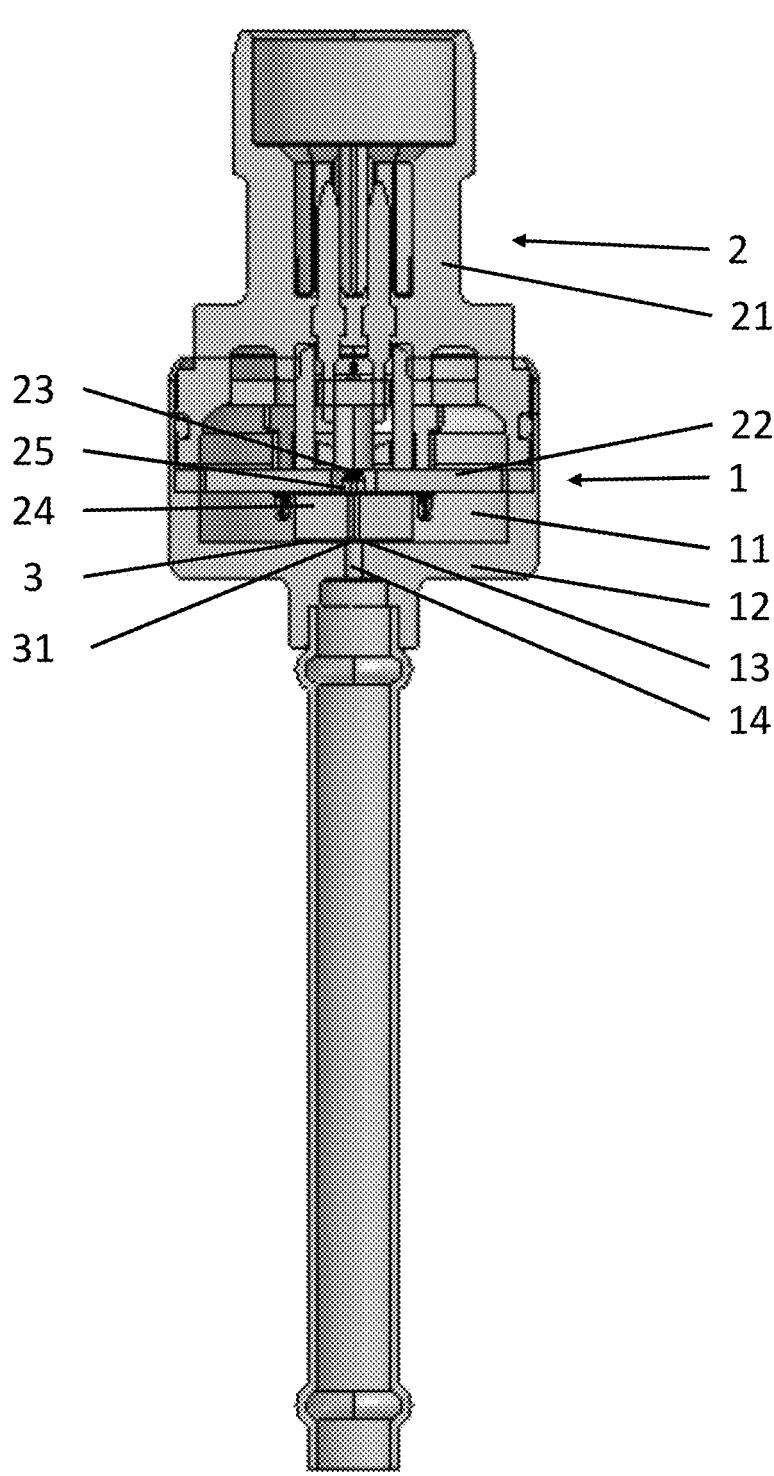
FIG. 1: complete sensor arrangement.

FIG. 1 shows a sectional view of an embodiment of a pressure sensor arrangement, which has been fully assembled according to the presently described assembly method. The pressure sensor arrangement comprises a housing 1 with a sensor chamber 11. The sensor chamber 11 may be a preferably at least partially cylindrical space bound at least partially by walls of the housing 1.

The pressure sensor arrangement further comprises a pressure connector 12 with a fluid inlet opening 13 and a fluid channel 14. A subassembly 2 is provided with an electrical connector 21 and a pressure sensing element 22. The pressure connector 12 and the housing 1 may be formed integrally or may be formed by two connected components. A ceramic carrier 24 may be a part of the pressure sensing element 22.

A preformed resin component 3 with a hole 31 and an embedded carrier structure is provided between the pressure connector 12 and the pressure sensing element 22. The ceramic carrier 24 of the pressure sensing element 22 may be in direct contact with the preformed resin component 3. The preformed resin component 3 is a relatively thin foillike part, which is shown in a cross section and which is hardly visible in FIG. 1. It will be shown in more detail in FIGS. 6*a* to 7*b*.

The method for assembling the pressure sensor arrangement comprises the steps of positioning the preformed resin component 3 at the pressure connector 12 such that the fluid inlet opening 13 of the pressure connector 12 and the hole 31 of the preformed resin component 3 communicate with each other, pressing the subassembly 2 against the preformed resin component 3 such that the pressure sensing element 22 communicates with the hole 31, fixing the housing 1 to the subassembly 2, and curing the resin component 3 to create a hermetic connection between the pressure connector 12 and the pressure sensing element 22.

The electrical connector 21 and the pressure sensing element 22 may be regarded as the first subassembly 2. The pressure sensor arrangement may comprise different subassemblies, each comprising at least two subcomponents, which might be preassembled prior to the assembly of the entire pressure sensor arrangement.

The housing 1 comprising e.g. the pressure connector 12 may be regarded as a second subassembly, delimiting a chamber volume to accommodate the pressure sensing element 22 and/or at least a portion of the electrical connector 21. The electrical connector 21 may be connected to the pressure sensing element 22 to form the first subassembly 2 prior to the pressing of the subassembly 2 against the preformed resin component 3. All required steps for forming the functioning subassembly 2 such as connecting and/or testing the subcomponents of the subassembly 2 may be performed prior to the assembly of the entire pressure sensor arrangement, thereby facilitating the manufacturing of the subassembly 2 and the entire pressure sensor arrangement.

The connection between the first subassembly 2 and the housing 1 may be provided by applying an epoxy film preform to a bottom surface or an inside bottom surface of the sensor chamber 11. The preformed resin component 3, which may presently be referred to as preform 3, comprises a hole 31 such as a central opening, which may be concentrically arranged with the fluid channel 14 of the pressure connector 12. Corresponding channels may be formed in the ceramic carrier 24, a glass support 25 of the pressure sensing element 22 and/or other components of the pressure sensor arrangement to allow fluid connection between the fluid channel 14 in the housing 1 and the backside of a pressure sensing sensor 23 such as a sensor chip.

The preformed resin component 3 may comprise heat curable epoxy resin material. Prior to curing, the preformed resin component 3 may be flexible. The embedded carrier structure of the preformed resin component 3 may be an embedded woven glass fabric carrier structure. The carrier structure ensures that the preformed resin component 3 is not compressed too much, when the subassembly 2 is pressed against the preformed resin component 3. The preformed resin component 3 may therefore be easier held in a desired place during pressing and/or curing. The heat curable epoxy resin material facilitates a controllable curing of the preformed resin component 3, once all required components are assembled prior to the curing step. The preformed resin component 3 may be stamped or cut, e.g. laser cut, out of e.g. film sheets. At room temperature, the preformed resin component 3 may be non-sticking and easy to handle.

When positioning the preformed resin component 3 at the pressure connector 12, the two components may be brought in close and direct contact with each other. The preformed resin component 3 may be positioned at the pressure connector 12 together with the subassembly 2 or prior to the positioning of the subassembly 2. It is hence conceivable to first connect the preformed resin component 3 to the subassembly 2 and only then position the preformed resin component 3 together with the subassembly 2 at the pressure connector 12.

Once the preform 3 is arranged on the inner bottom surface of the sensor chamber 11 i.e. at the pressure connector 12 and the first subassembly 2 is inserted at least partially in the chamber 11 until a second end surface of the ceramic carrier 24 opposite to its first end surface abuts the preform 3, an end section of the housing wall is crimped radially inwards onto a surface and/or an edge of the electrical connector 21. The crimping may occur at or close to the widest portion of the electrical connector 21, wherein the widest portion of the electrical connector 21 is positioned within the housing 1. The crimping process is done while axially pressing the first subassembly 2 towards the bottom of the housing 1, such that the preform 3 is preloaded by the pressing force.

When the subassembly 2 is pressed against the preformed resin component 3, it needs to be ensured that the pressure sensing element 22 communicates with the hole 31 of the preformed resin component 3. The pressure sensing element 22 needs to contact the fluid present outside of the pressure sensor arrangement via fluid conduits for determining its pressure. A corresponding fluid connection between the pressure sensing element 22 and the outside of the arrangement exposed to the measured fluid is therefore provided.

In a final step, the pressure sensor arrangement is exposed to a controlled temperature profile for curing the preform 3. During curing, the material of the preform 3 softens. The preloading force applied to the preform 3 squeezes the preform 3 and ensures good wetting of the preform 3 material on both surfaces contacting the neighboring components. The embedded carrier structure of the preform 3 ensures a minimum height of the finally resulting adhesive layer formed by the cured preform 3. Once the temperature is lowered to a normal operating temperature, the preform 3 solidifies and provides an adhesive connection between the adjacent components.

During the curing of the preform 3, temperature compensation and/or calibration of the pressure sensing element 22 may be performed. As the desired compensation temperatures are within the necessary temperature range for curing the preform material, the compensation and/or calibration of the pressure sensing element 22 can be performed at the same time as the curing, thereby reducing the overall time required for assembling the pressure sensor arrangement. Here, processes such as compensation and/or calibration are regarded as part of the assembly process.

The invention is also directed at a pressure sensor arrangement assembled with the presently described method. The pressure sensor arrangement comprises the housing 1 with its sensor chamber 11 and the pressure connector 12 with its fluid inlet opening 13 fluid channel 14, the subassembly 2 with its electrical connector 21 and pressure sensing element 22, and the preformed resin component 3 with its hole 31 provided between the subassembly 2 and the pressure connector 12. The pressure sensor arrangement may comprise any of the physical features described with reference to the assembly method.

Figure 2:
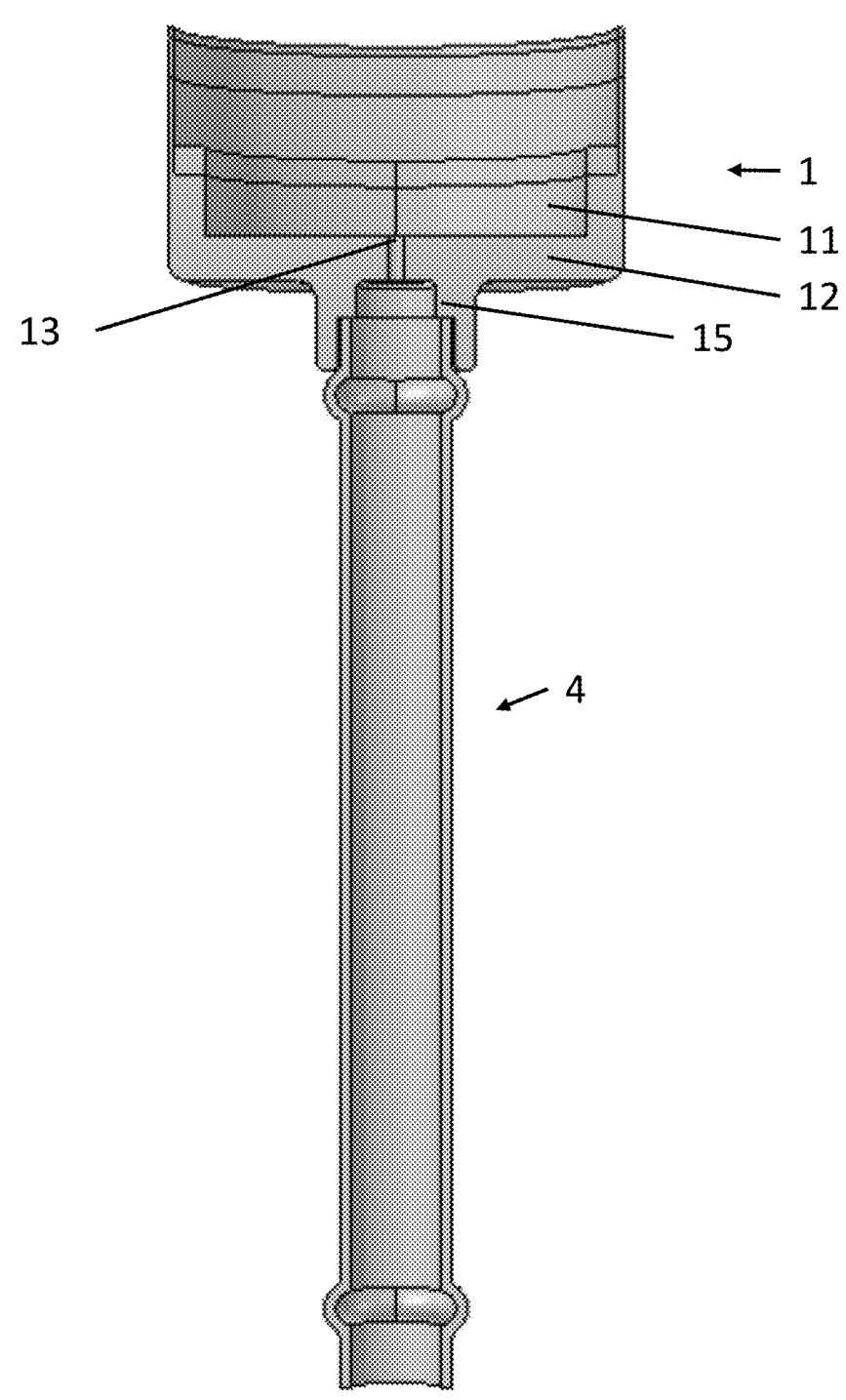
FIG. 2: housing, including a pressure connector and a connector element.

FIG. 2 shows a sectional view of the housing 1, the pressure connector 12 and a connector element 4. The components shown in FIG. 2 may form the second subassembly, which is used during the assembly method.

The connector element 4 may be a tube or any other pressure connector and/or inlet known form the art, which is e.g. soldered to the pressure connector 12. The connector element 4 may fluidly connect the inside of the housing 1, i.e. the sensor chamber 11, to a fluid system, in which a fluid pressure is measured by the pressure sensor arrangement. The connection between the connector element 4 and the pressure connector 12 may comprise a threaded connector element 4 and/or a tubular element, e.g. a soldered tube, with any suitable dimensions. The housing 1 and/or the connector element 4 may be formed of metal materials. They may be formed as separate parts secured to each other by suitable methods such as welding or soldering. Alternatively, they may be formed as one integral part, preferably where the connector element 4 may have other shapes than a pure tubular shape, e.g. comprising a threaded section for connection of the pressure sensor arrangement with a fluid system, the fluid pressure of which has to be measured.

The pressure connector 12 may comprise a cylindrical recess portion 15, which may be arranged concentrically with respect to an outer circumference of the housing 1. The cylindrical recess portion 15 may be used for providing a connection between the pressure connector 12 and the connector element 4. The cylindrical recess portion 15 may be aligned concentrically with the fluid inlet opening 13.

Figure 3:
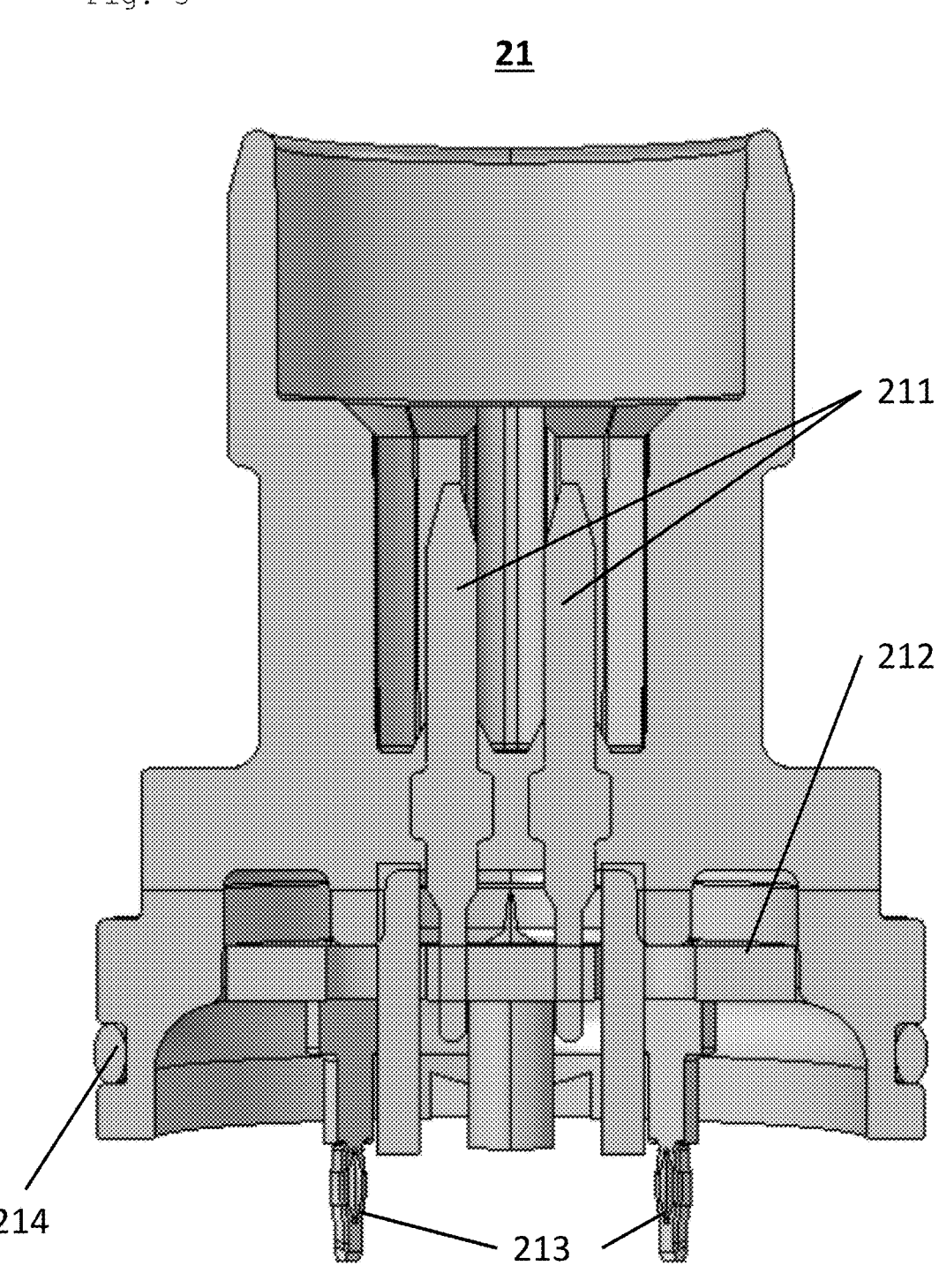
FIG. 3: electrical connector.

FIG. 3 shows a detailed view of the electrical connector 21. The electrical connector 21 may comprise electrical leads 211 for both, power supply to the pressure sensing element 22 shown in more detail in FIG. 4 and output signal delivery from the pressure sensing element 22 to the external environment of the pressure sensor arrangement. The electrical connector 21 may be provided for plug and/or cable connections, and/or may preferably be manufactured from electrically insulating polymer materials.

The electrical connector 21 may comprise a second PCB 212, which may be connected to the electrical leads 211 on one side. On the other side of the second PCB 212, pins 213 may be provided. The pins 213 may comprise portions of different resiliencies. The pins 213 may provide press fit connections between the electrical connector 21 and other components. The pins 213 and/or the electrical leads 211 may function as electrical connectors between the second PCB 212 and other electrical components. An O-ring 214 may be provided at an external groove of the electrical connector 21. The O-ring 214 and its groove may be provided at a cylindrical portion of the electrical connector 21 with the widest diameter of the entire electrical connector 21.

Figure 4:
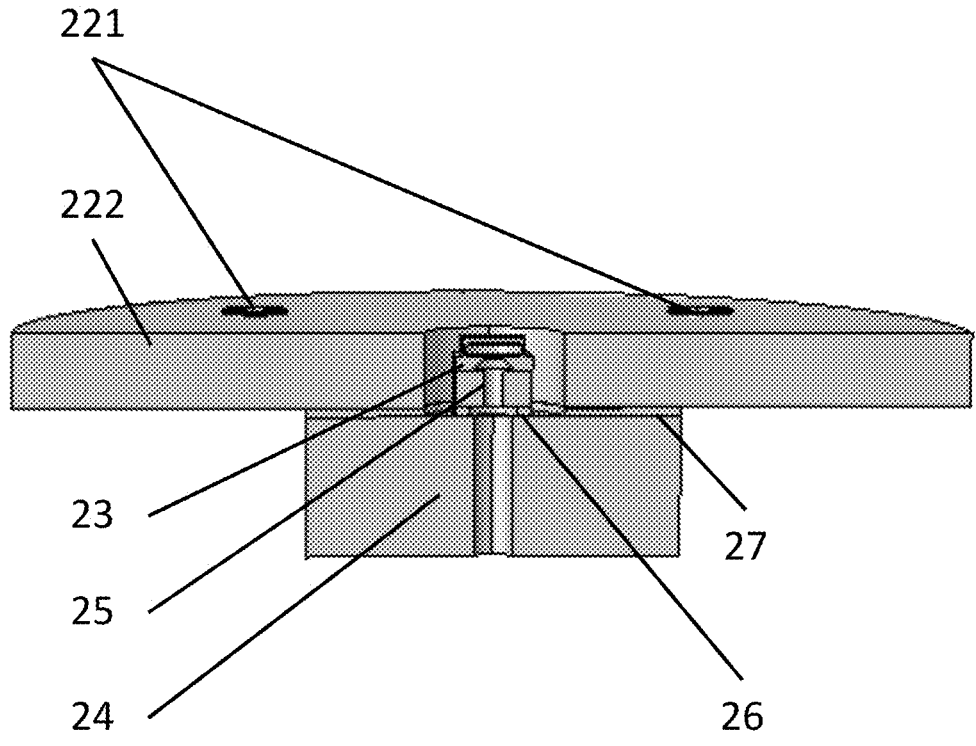
FIG. 4: pressure sensing element.

FIG. 4 shows the pressure sensing element 22 in more detail. The pressure sensing element 22 comprises pin holes 221 for inserting the pins 213 of the electrical connector 21 shown in FIG. 3. A pressure sensing sensor 23 such as a MEMS chip, in particular a backside exposed MEMS sensor die, a thin film strain gauge sensor on a flexible metal or ceramic membrane and/or a capacitive sensor may be provided in a preferably central portion of the pressure sensing element 22. The glass support 25 or any other suitable support structure supports the pressure sensing sensor 23.

The pressure sensing sensor 23, the glass support 25 and the ceramic carrier 24 may be aligned coaxially with respect to each other. The glass support 25 and the ceramic carrier 24 may comprise central fluid conduits extending in an axial direction of the pressure sensing element 22 and/or fluidly connecting a side of the pressure sensing sensor 23 to the exterior of the pressure sensor arrangement. There may be other additional fluid conduits leading from the ceramic carrier 24 towards an opening to the exterior of the pressure sensor arrangement.

The axial direction of the pressure sensing element 22 and of the pressure sensor arrangement in general may correspond to the direction in which the components of the pressure sensor arrangement are assembled and in particular, in which the subassembly 2 is pressed against the preformed resin component 3 shown in FIG. 1. It is the vertical direction in FIG. 4. The radial direction may be perpendicular to the axial direction.

The pressure sensing element 22 may comprise a first PCB 222, which may be connectable to the second PCB 212 of the electrical connector 21 shown in FIG. 3. The connection between the two PCBs may comprise the pins 213 shown in FIG. 3. The glass support 25 may be connected to the ceramic carrier 24 via a first adhesive layer 26. The first PCB 222 may be connected to the ceramic carrier 24 via a second adhesive layer 27. The two adhesive layers 26, 27 may be arranged coplanar and/or concentrically with respect to each other. The pressure sensing sensor 23 may be provided at least partially or fully radially inside the first PCB 222.

The pressure sensing element 22 may be regarded as a third subassembly preferably comprising a MEMS element, e.g. a silicon pressure sensor chip 23 mounted with its backside on the glass support 25. The sensor chip 23 and/or glass support 25 may be secured to a first end surface of the ceramic carrier element 24 for temperature protection and stress relief with an adhesive. The first PCB 222 may also be fastened, e.g. glued, to the first end face of the ceramic carrier 24. The first PCB 222 may comprise a central opening to accommodate the sensor chip 23 and glass support 25. The first PCB 222 may comprise electronic components for e.g. temperature compensation, calibration and other signal processing circuitry. Wire bonds may be used to electrically connect the sensor chip 23 with the first PCB 222. The pressure sensing element 22 may be calibrated and temperature compensated at its subassembly state shown in FIG. 4, i.e. prior to the assembly of the pressure sensor arrangement or at a later state in manufacturing the pressure sensor arrangement.

Figure 5:
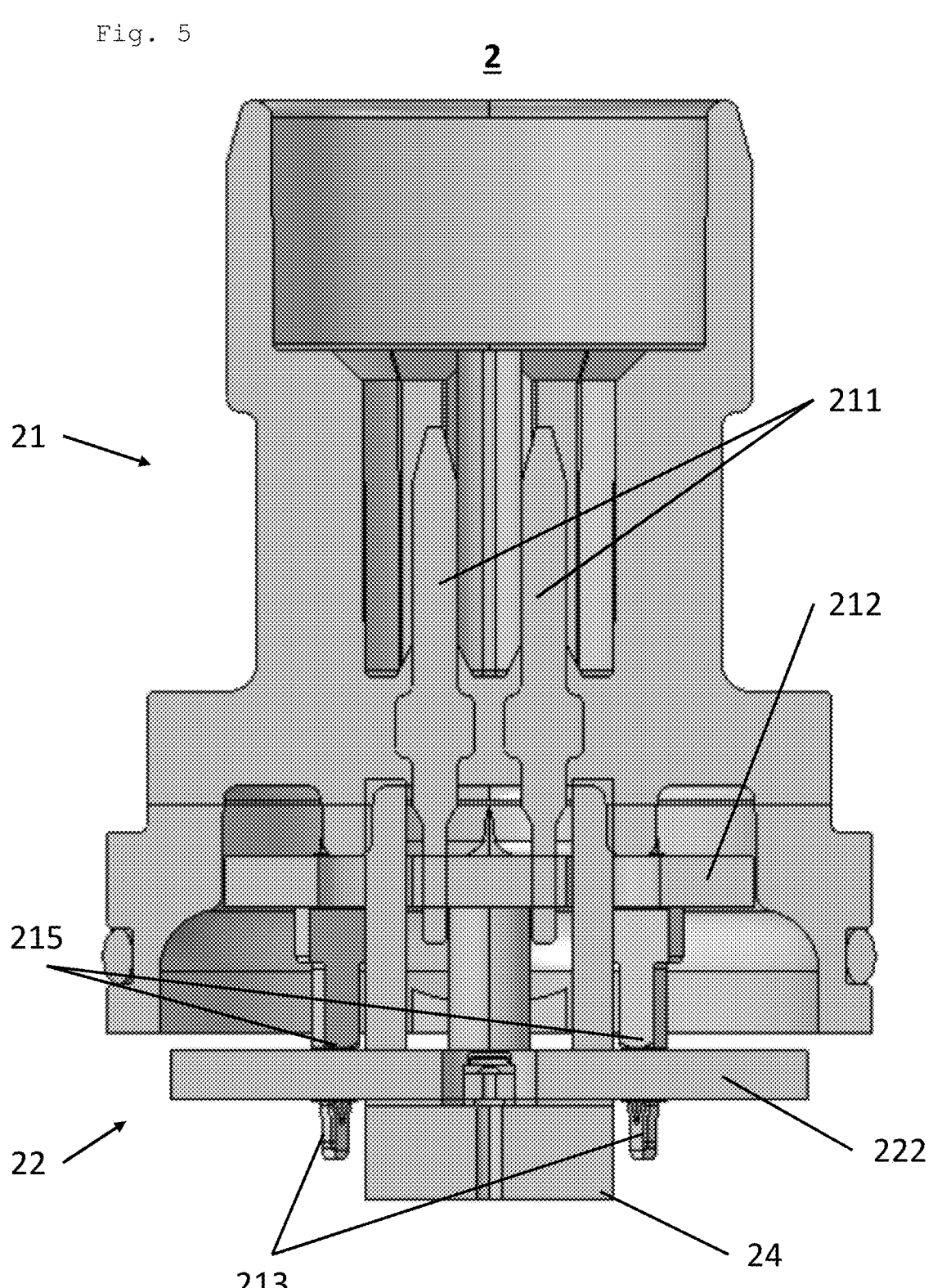
FIG. 5: first subassembly.

FIG. 5 shows a detailed sectional view of the first subassembly 2, comprising the electrical connector 21 and the pressure sensing element 22. The pressure sensing element 22 is connected to the electrical connector 21 via pins 213. The pressure sensing element 22 may be press-fit to the pins 213. The pins 213 may comprise an abutment 215 for abutting the pressure sensing element 22. The ceramic carrier 24 is the bottom most component of the subassembly 2. The ceramic carrier 24 may be the only component of the subassembly 2, which is in direct contact with the preformed resin component 3 shown in FIGS. 1, 6a and 6b.

The connection between the pressure sensing element 22 and the electrical connector 21 forming the first subassembly 2 may be directly between the first PCB 222 and the leads 211 of the electrical connector 21, e.g. by soldered wires or flexible printed circuit boards. Alternatively, as shown in FIG. 5, pin connectors or pins 213 may be used between the first PCB 222 and the second PCB 212 attached to the leads 211 of the electrical connector 21. Resilient portions at both axial ends of the pin connectors or pins 213 may be pressed into corresponding openings or pin holes 221 of first and second PCBs 222, 212 shown in FIG. 4.

9

Figure 6A:
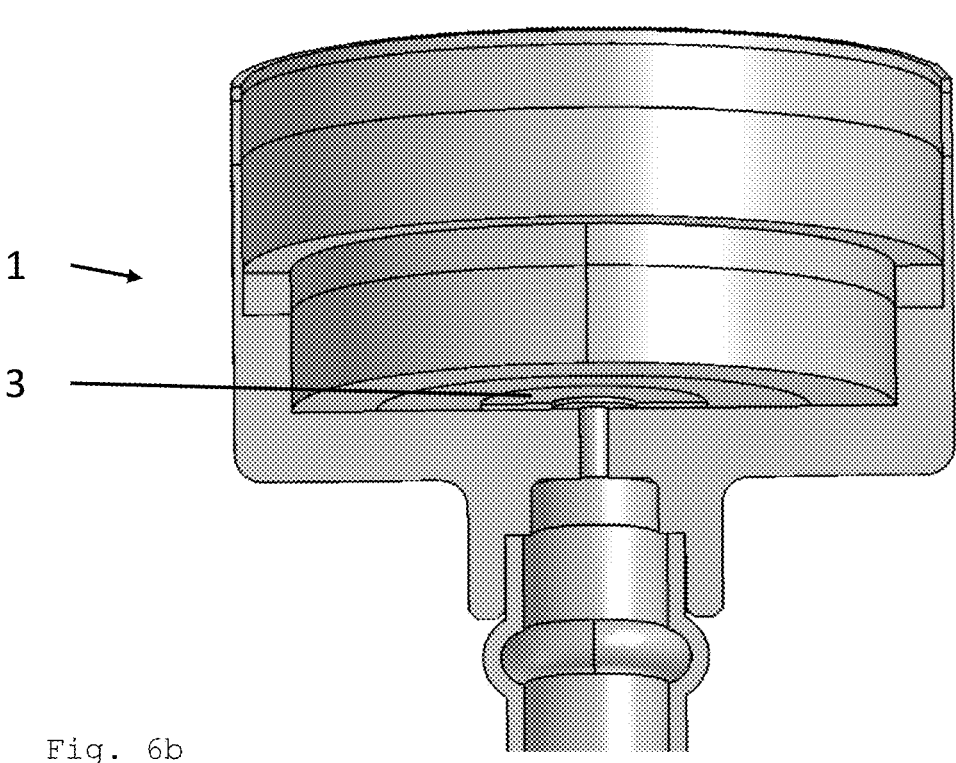
FIG. 6a: housing with mounted preform.
Figure 6B:
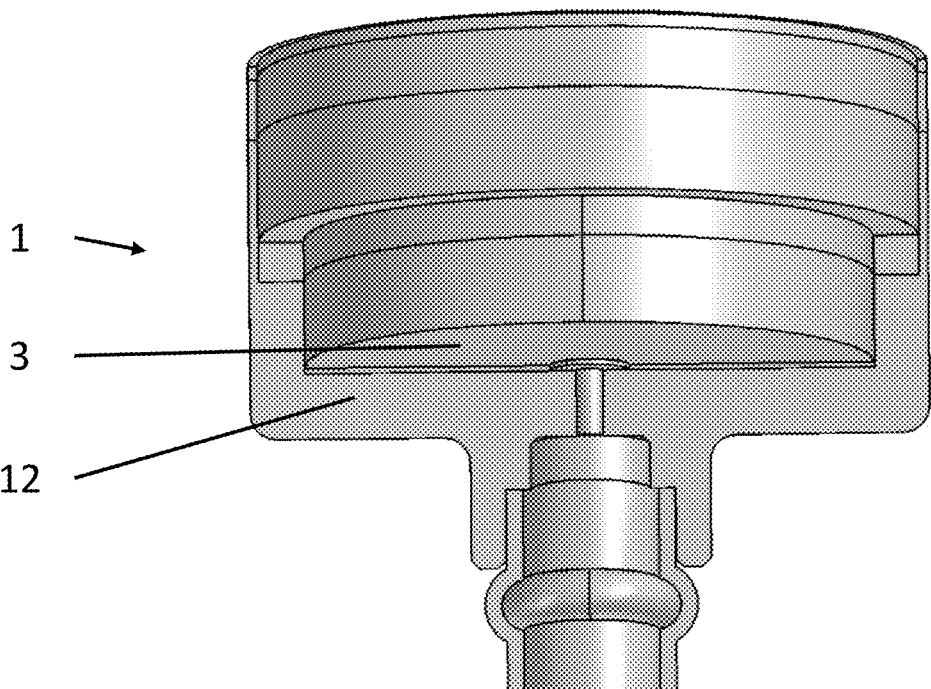
FIG. 6b: housing with another (larger) mounted preform.

FIGS. 6a and 6b show two embodiments of the housing 1 with mounted preforms 3. The preform 3 of the embodiment of FIG. 6a is substantially smaller than the preform 3 shown in FIG. 6b. The diameter of the preform 3 of FIG. 6a may be less than 50% and preferably less than 30% of the outer diameter of the housing 1. The size and shape of the preform 3 may be selected such that a sufficient contact area between the ceramic carrier 24 shown in FIG. 4 and the pressure connector 12 is established for mechanical stability under assembly and for achieving proper bonding. The outer diameter of the preform 3 may be more than 30% of the outer diameter of the ceramic carrier 24 and/or may cover the entire upper inner side of the pressure connector 12 in the embodiment of FIG. 6b.

The diameter of the preform 3 shown in FIG. 6b may be greater than 50% and preferably more than 75% of the outer diameter of the housing 1. The preform 3 may cover the entire upper inner side of the pressure connector 12 in the embodiment of FIG. 6b.

The preform 3 may be attached to the housing 1, or more precisely, to an upward pointing face of the pressure connector 12, prior to the insertion of the subassembly 2 into the housing 1, i.e. prior to the subassembly 2 being pressed against the preform 3.

Figure 7A:
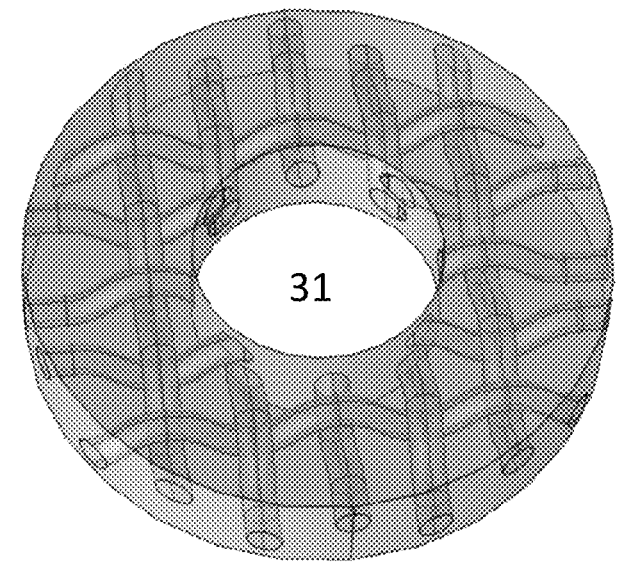
FIG. 7a: preform, circular shape.
Figure 7B:
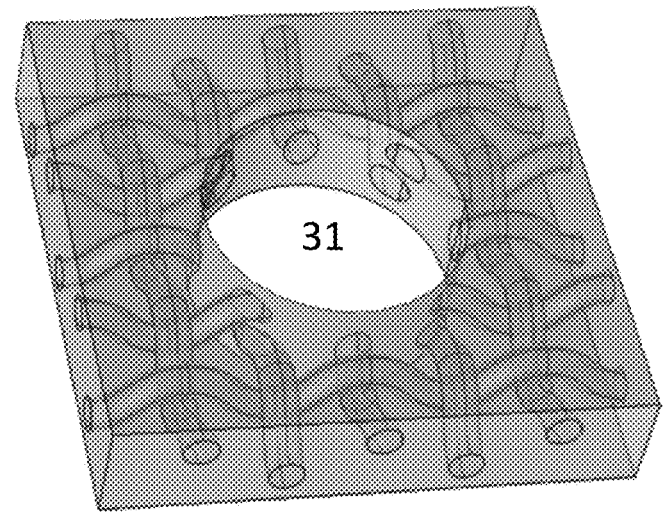
FIG. 7b: preform, square shape.

FIGS. 7a and 7b show different embodiments of the preform 3 with exaggerated thickness to illustrate carrier structures inside the preforms 3. In FIG. 7a, the preform 3 is of a circular shape. More precisely, the preform 3 is shaped as a hollow cylindrical structure. The preform 3 may be a foil with a thickness that is much smaller, i.e. by at least one order of magnitude, than its other dimensions. A carrier structure is shown inside the preform 3. The carrier structure may comprise fiber elements. The fiber elements may be woven for providing structural support to the preform 3.

FIG. 7b shows a square shaped preform 3 with similar fiber elements functioning as a carrier structure. Both embodiments of FIGS. 7a and 7b comprise a circular hole 31, which provides a fluid passage between the pressure sensing element 22 and the outside of the pressure sensor arrangement as shown in FIG. 1.

Figure 8:
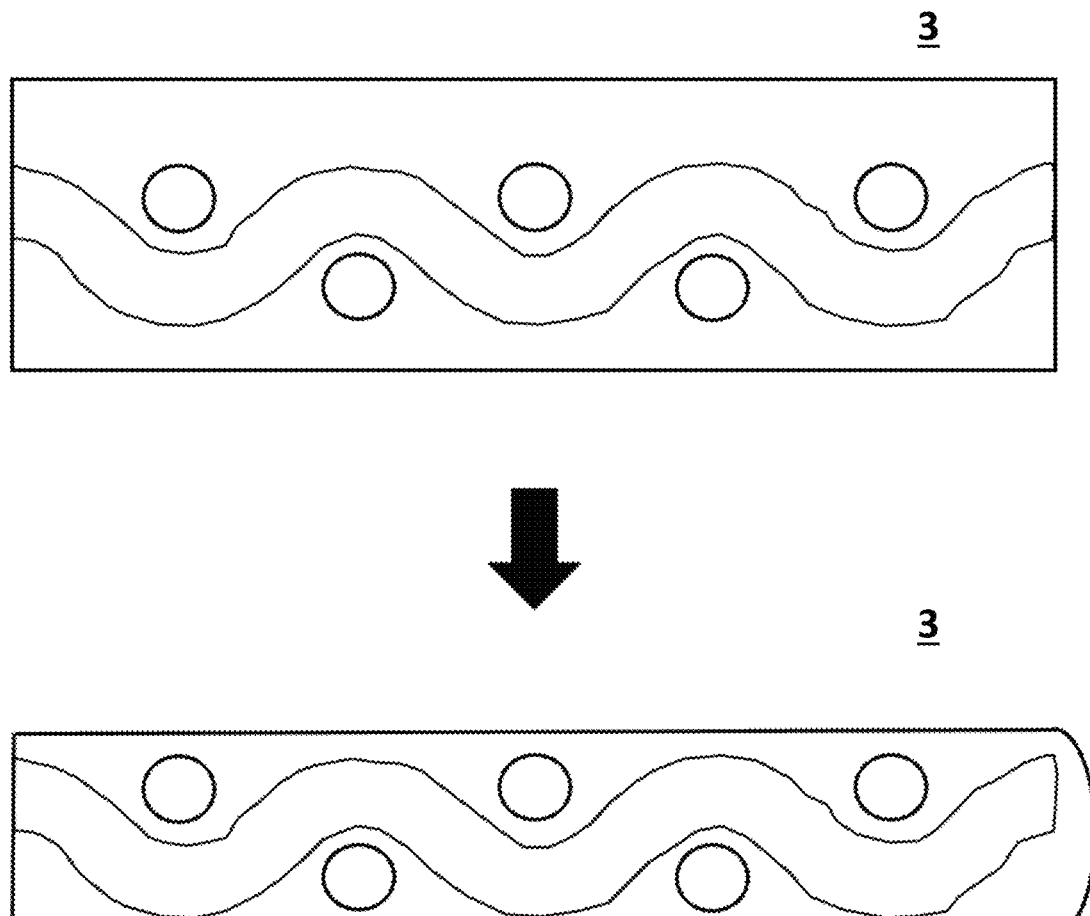
FIG. 8: preform cross-section, uncured and cured state.

FIG. 8 shows cross-sectional views of the preform 3. Fibers are shown immersed in a matrix made of e.g. a heat curable epoxy material. The epoxy material may be a resin material, which exhibits hermetic properties with respect to the fluid to be measured, in particular flammable and semi-flammable gases. The selected epoxy or resin material may have very low permeability to specific fluids. The selected epoxy resin material may comprise various types of epoxies, cyanate esters, bismaleimides, polyimides and/or similar materials with low permeability to the media or fluid in question.

The upper image shows the preform 3 in its uncured state, the lower image shows the preform 3 in its cured state. In the cured state, the thickness of the preform 3 is reduced compared to its uncured state. Furthermore, in the cured state, less matrix material is present at a given gross sectional area of the preform 3. The matrix material has been squeezed against the subassembly 2 and the pressure connector 12, such that a sufficiently large contact surface area between the subassembly 2 and the pressure connector 12 on the one side and the preform 3 on the other side is provided, without clogging the preferably circular hole 31.

The presently described features of the various embodiments may be combined in any suitable way within the scope of the present invention.

10

What is claimed is:

1. A method for assembling a pressure sensor arrangement, the pressure sensor arrangement comprising a housing with a sensor chamber and a pressure connector with a fluid inlet opening and a fluid channel, a subassembly with an electrical connector and a pressure sensing element, and a preformed resin component with a hole and an embedded carrier structure, the method comprising the steps of:
   positioning the preformed resin component at the pressure connector such that the fluid inlet opening and the hole communicate with each other,
   pressing the subassembly against the preformed resin component such that the pressure sensing element communicates with the hole,
   fixing the housing to the subassembly, and
   curing the resin component to create a hermetic connection between the pressure connector and the pressure sensing element;
   wherein a fluid connection between the pressure sensing element and an outside of the pressure sensor arrangement is provided.

2. The method according to claim 1, wherein the preformed resin component comprises heat curable epoxy resin material and/or that the embedded carrier structure is an embedded woven glass fabric carrier structure.

3. The method according to claim 2, wherein the pressure sensing element comprises a pressure sensing sensor such as a MEMS pressure sensor, a thin film strain gauge sensor on a flexible metal or ceramic membrane and/or a capacitive sensor.

4. The method according to claim 2, wherein the preformed resin component is positioned at the pressure connector together with or without the subassembly.

5. The method according to claim 2, wherein the electrical connector is connected to the pressure sensing element to form the subassembly prior to the pressing of the subassembly against the preformed resin component.

6. The method according to claim 2, wherein the housing is crimped to the electrical connector of the subassembly while the subassembly is pressed against the preformed resin component.

7. The method according to claim 1, wherein the pressure sensing element comprises a pressure sensing sensor such as a MEMS pressure sensor, a thin film strain gauge sensor on a flexible metal or ceramic membrane and/or a capacitive sensor.

8. The method according to claim 7, wherein the preformed resin component is positioned at the pressure connector together with or without the subassembly.

9. The method according to claim 7, wherein the electrical connector is connected to the pressure sensing element to form the subassembly prior to the pressing of the subassembly against the preformed resin component.

10. The method according to claim 7, wherein the housing is crimped to the electrical connector of the subassembly while the subassembly is pressed against the preformed resin component.

11. The method according to claim 1, wherein the preformed resin component is positioned at the pressure connector together with or without the subassembly.

12. The method according to claim 11, wherein the electrical connector is connected to the pressure sensing element to form the subassembly prior to the pressing of the subassembly against the preformed resin component.

13. The method according to claim 11, wherein the housing is crimped to the electrical connector of the subassembly while the subassembly is pressed against the preformed resin component.

14. The method according to claim 1, wherein the electrical connector is connected to the pressure sensing element to form the subassembly prior to the pressing of the subassembly against the preformed resin component.

15. The method according to claim 14, wherein the housing is crimped to the electrical connector of the subassembly while the subassembly is pressed against the preformed resin component.

16. The method according to claim 1, wherein the housing is crimped to the electrical connector of the subassembly while the subassembly is pressed against the preformed resin component.

17. The method according to claim 1, wherein temperature compensation and/or calibration of the pressure sensing element is performed during the curing of the resin component.

18. The method according to claim 1, wherein a connector element is connected to the pressure connector.

19. A pressure sensor arrangement comprising a housing with a sensor chamber and a pressure connector with a fluid inlet opening and a fluid channel, a subassembly with an electrical connector and a pressure sensing element, and a preformed resin component with a hole and an embedded carrier structure provided between the subassembly and the pressure connector, wherein the pressure sensor arrangement is assembled by the method according to claim 1.

\*   \*   \*   \*   \*